US010854891B2

(12) United States Patent
Glueck et al.

(10) Patent No.: US 10,854,891 B2
(45) Date of Patent: Dec. 1, 2020

(54) SEPARATOR PLATE FOR AN ELECTROCHEMICAL SYSTEM

(71) Applicant: REINZ-DICHTUNGS-GMBH, Neu-Ulm (DE)

(72) Inventors: Rainer Glueck, Dornstadt (DE); Claudia Kunz, Ulm (DE); Ahmet Oruc, Heidenheim (DE); Andre Speidel, Orsenhausen (DE); Stephan Wenzel, Pfaffenhofen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 220 days.

(21) Appl. No.: 15/760,677

(22) PCT Filed: Sep. 16, 2016

(86) PCT No.: PCT/EP2016/072081
§ 371 (c)(1),
(2) Date: Mar. 16, 2018

(87) PCT Pub. No.: WO2017/046405
PCT Pub. Date: Mar. 23, 2017

(65) Prior Publication Data
US 2019/0088956 A1 Mar. 21, 2019

(30) Foreign Application Priority Data
Sep. 18, 2015 (DE) .................. 20 2015 104 972

(51) Int. Cl.
H01M 8/02 (2016.01)
C25B 9/18 (2006.01)
(Continued)

(52) U.S. Cl.
CPC ............ *H01M 8/0254* (2013.01); *C25B 9/04* (2013.01); *C25B 9/18* (2013.01); *C25B 9/20* (2013.01);
(Continued)

(58) Field of Classification Search
None
See application file for complete search history.

(56) References Cited

U.S. PATENT DOCUMENTS 8,158,299 B2   4/2012   Blank et al.
9,331,344 B2   5/2016   Asano et al.
(Continued)

FOREIGN PATENT DOCUMENTS

CA    2949586 A1    11/2015
DE    10248531 A1   4/2004
(Continued)

OTHER PUBLICATIONS

European Patent Office, International Search Report with Written Opinion issued in PCT/EP2016/072081, dated Nov. 24, 2016, 12 pages, European Patent Office, Rijswijk, Netherlands.
(Continued)

*Primary Examiner* — Maria Laios
*Assistant Examiner* — Angela J Martin
(74) *Attorney, Agent, or Firm* — McCoy Russell LLP

(57) ABSTRACT

A separator plate for an electrochemical system may have at least one passage opening for forming a media channel for feeding or discharging media. The system may also have at least one bead arrangement arranged around the at least one passage opening, for the purpose of sealing the passage opening. At least one of the flanks of the bead arrangement may have at least one opening for conducting a medium through the bead flank. The system may also have at least one guide channel that is connected, on an exterior of the
(Continued)

bead arrangement, to the openings in the bead flank and is fluidically connected to a bead interior via the opening in the bead flank. The guide channel is designed such that a guide channel width, determined parallel to the flat surface plane of the separator plate, increases at least in some sections in the direction of the bead arrangement.

23 Claims, 10 Drawing Sheets

(51) Int. Cl.
*C25B 9/20* (2006.01)
*H01M 8/0254* (2016.01)
*H01M 8/0206* (2016.01)
*H01M 8/0265* (2016.01)
*H01M 8/0267* (2016.01)
*H01M 8/0271* (2016.01)
*H01M 8/0247* (2016.01)
*C25B 9/04* (2006.01)

(52) U.S. Cl.
CPC ....... *H01M 8/0206* (2013.01); *H01M 8/0247* (2013.01); *H01M 8/0265* (2013.01); *H01M 8/0267* (2013.01); *H01M 8/0271* (2013.01)

(56) References Cited

U.S. PATENT DOCUMENTS

| | | |
|---|---|---|
| 2008/0044711 A1 | 2/2008 | Grafl et al. |
| 2009/0325036 A1 | 12/2009 | Blank et al. |
| 2013/0177827 A1 | 7/2013 | Okabe et al. |
| 2015/0132680 A1 | 5/2015 | Asano et al. |
| 2016/0380277 A1 | 12/2016 | Okabe et al. |

FOREIGN PATENT DOCUMENTS

| | | | |
|---|---|---|---|
| DE | 202012004927 U1 | 10/2013 | |
| DE | 102013208877 A1 * | 11/2013 | ........ H01M 8/04149 |
| DE | 102013208877 A1 | 11/2013 | |
| DE | 202014004456 U1 | 5/2015 | |
| JP | 2006504872 A | 2/2006 | |
| WO | 2004036677 A2 | 4/2004 | |

OTHER PUBLICATIONS

Japanese Patent Office, Office Action Issued in Application No. 2018-513649, dated Jan. 7, 2020, 9 pages.
State Intellectual Property Office of the People's Republic of China, Office Action and Search Report Issued in Application No. 201680067640.1, dated Jun. 29, 2020, 11 pages. (Submitted with Partial Translation).

* cited by examiner

SEPARATOR PLATE FOR AN ELECTROCHEMICAL SYSTEM

BACKGROUND OF THE INVENTION

The invention relates to a separator plate for an electrochemical system. For example, the electrochemical system can be a fuel cell system, an electrochemical compressor, a humidifier for a fuel cell system, or an electrolyser.

Known electrochemical systems usually comprise multiple separator plates, which are arranged in a stack, so that every two adjacent separator plates enclose an electrochemical cell or a humidifier cell. The separator plates usually each comprise two individual plates, which are connected to one another along their rear sides facing away from the electrochemical cells or dehumidifier cells. For example, the separator plates can be used in order to electrically contact the electrodes of the individual electrochemical cells (for example fuel cells) and/or to electrically connect adjacent cells (series connection of the cells). The separator plates can also be used to dissipate heat produced in the cells between the separator plates. Waste heat of this kind can be produced for example at the time of conversion of electrical or chemical energy in a fuel cell. In the case of fuel cells, bipolar plates are often used as separator plates.

The separator plates or the individual plates of the separator plates each usually have at least one passage opening. The passage openings of the stacked separator plates, which openings are aligned or at least partially overlap with one another in the separator plate stack of the electrochemical system, then form media channels for feeding or discharging media. In order to seal the passage openings or the media channels formed by the passage openings of the separator plates, known separator plates also have bead arrangements, arranged one around each of the passage openings of the separator plate.

The individual plates of the separator plate can additionally have channel structures for feeding a medium or a plurality of media to an active region of the separator plate and/or for transporting media away. The active region for example can enclose or delimit an electrochemical cell or a humidifier cell. For example, the media can be constituted by fuels (for example hydrogen or methanol), reaction gases (for example air or oxygen) or can be present as a cooling medium in the form of fed media and can be constituted by reaction products and heated cooling medium as discharged media. In the case of fuel cells, the reaction media, i.e. fuel and reaction gases, are usually guided over the surfaces of the individual plates facing away from one another, whereas the cooling medium is guided between the individual plates.

The flanks of the bead arrangement arranged around the passage opening of the separator plate can have one or more openings. These openings are used to produce a fluidic connection between the passage opening of the separator plate and the active region of the separator plate or between the passage opening of the separator plate and a cavity formed between the individual plates of the separator plate. The cavity is used for example to guide a cooling medium between the individual plates of the separator plate.

It is known from document DE10248531A1 that the separator plate or at least one of the individual plates can additionally have one or more guide channels, which on an exterior of the bead arrangement are connected to the openings in the bead flank and are fluidically connected to a bead interior via the openings in the bead flank. A medium can pass through the bead arrangement much more specifically with the aid of a guide channel of this kind. The efficiency of the electrochemical system can thus be increased.

However, the openings in the bead flanks necessarily bring about a reduction of the mechanical stability and elasticity of the bead arrangement. This reduction is all the greater, the lower the bead arrangement is arranged. At the same time, however, the shortest height possible of the bead arrangement is advantageous, in order to minimise the size of the separator plate stack and in order to accommodate more cells without increasing the height of the separator plate stack.

SUMMARY OF THE INVENTION

The object of the present invention is therefore to create a separator plate for an electrochemical system, which separator plate has the best possible mechanical stability and compactness and ensures the most efficient possible media supply of the system.

This object is achieved by a separator plate for an electrochemical system according to claim 1. Specific embodiments are described in the dependent claims.

Thus, what is proposed is a separator plate for an electrochemical system. The proposed separator plate comprises at least:
- at least one passage opening for forming a media channel for feeding or discharging media;
- at least one bead arrangement, arranged around the at least one passage opening, for the purpose of sealing said passage opening, wherein at least one of the flanks of the bead arrangement comprises at least one opening for conducting a medium through the bead flank; and
- at least one guide channel, which, on an exterior of the bead arrangement, is connected to the opening in the bead flank and is fluidically connected to a bead interior via the opening in the bead flank. For example, the separator plate can have precisely one guide channel per opening, which guide channel is connected to this opening.

Here, the guide channel is designed such that a width of the guide channel defined parallel to the flat surface plane of the separator plate increases in the direction of the bead arrangement at least in sections, preferably in the middle 25%, in particular in the middle third of the extent of the guide channel.

Here, the width of the guide channel is preferably determined in each case at half height of the guide channel, wherein the height of the guide channel is given by the distance of a roof of the guide channel from the flat surface plane of the separator plate. The width of the guide channel is also preferably determined in each case along a cross-sectional area of the guide channel, oriented perpendicularly to the longitudinal direction of the guide channel or perpendicularly to the direction of media flow through the guide channel. The guide channel preferably is connected to the opening in the bead flank in such a way that the cross-sectional area of the guide channel at the transition of the guide channel into the bead flank is identical to and coincides with the face of the opening in the bead flank. The channel walls forming the guide channel thus transition into the bead flank typically directly at the edges of the opening in the bead flank.

Since the width of the guide channel increases in the direction of the bead arrangement at least in sections, the opening in the bead flank, connected to by the guide channel on the exterior of the bead arrangement, can be formed wider and at the same time lower to the same extent as the guide channel. Compared to known guide channels of constant width and constant height, the stability and the elasticity of the bead arrangement can be improved without detriment to the guide channel cross-section. Efficient media passage through the bead flank is thus still ensured.

The guide channel can thus be designed such that the height of the guide channel, determined perpendicularly to the flat surface plane of the separator plate, decreases in the direction of the bead arrangement at least in sections. In particular, the guide channel can be designed such that the cross-sectional area of the guide channel, at least along the middle 25%, preferably at least along the middle third of the extent of the guide channel, changes by 25% at most, preferably by 20% at most, and in particular by 15% at most.

The guide channel usually extends from an end of the guide channel facing away from the bead arrangement and formed by an inlet and outlet of the guide channel, as far as the opening in the bead flank. Here, for example, the inlet or outlet of the guide channel can be formed by an opening in the separator plate or on an inner edge for example of a passage opening. For example, the end of the guide channel facing away from the bead arrangement can be given by an inlet or outlet of the guide channel, which inlet or outlet is arranged on an inner edge of the separator plate delimiting or surrounding the aforementioned passage opening in the separator plate. If the inlet or outlet of a guide channel are not formed as an opening or on an inner edge, they can also be formed by transitions to other structures. These ends of the guide channels are preferably provided with significant radii, which are used for the transition into the adjacent structure. With regard to the height and width considerations of relevance to the invention, only the middle half, preferably the middle third or the middle 25% of the extent of the guide channel is therefore preferably taken into consideration.

The guide channel can be designed such that the width of the guide channel increases monotonically along the extent of the guide channel, preferably strictly monotonically. This is true in particular for the 60% of the length of the guide channel directly adjacent to the bead flank. The width of the guide channel can increase in particular linearly along the extent of the guide channel. For example, the guide channel can be formed in such a way that the width of the guide channel increases along the extent of the guide channel in the direction of the bead arrangement at least by 10%, preferably at least by 20%. This is also true in particular for the 60% of the length of the guide channel directly adjacent to the bead flank.

Alternatively or additionally, the height of the guide channel along the extent of the guide channel can decrease monotonically, in particular strictly monotonically. This is true in particular for the middle third of the length of the guide channel. The height of the guide channel can decrease in particular linearly along the extent of the guide channel. For example, the guide channel can be designed such that the height of the guide channel decreases along the extent of the guide channel in the direction of the bead at least by 10%, preferably at least by 20%.

In order to ensure sufficient mechanical stability and minimally modified elasticity of the bead arrangement in the region of the opening in the bead flank, the opening can reach, perpendicularly to the flat surface plane of the separator plate, as far as a height that is up to 80%, preferably only up to 70% of the height of the bead arrangement. Here, the heights preferably relate in each case to the bead arrangement in the uncompressed state and are given in each case by the distance from the flat surface plane of the individual plate.

An inlet or outlet of the guide channel at the end of the guide channel facing away from the bead arrangement can reach, perpendicularly to the flat surface plane of the individual plate, as far as a height that is at most 90%, preferably at most 85%, preferably at most 75% of the height of the bead arrangement. Again, the height specifications are based here preferably on the bead arrangement in the uncompressed state and are given in each case by the distance from the flat surface plane of the individual plate. Normally, the height of the guide channel at the end of the guide channel facing away from the bead arrangement, however, is preferably always greater than the height of the opening in the bead arrangement.

The guide channel can have a rectangular, trapezoid or at least partially rounded cross-section, at least in part, for example at least along the middle third of the extent of the guide channel.

In order to improve the mechanical stability and elasticity of the bead arrangement, the bead arrangement can be designed such that it runs in a wave-like manner parallel to the flat surface plane of the plate at least in sections, in particular in those regions that, macroscopically considered, extend in a straight line. This results in a stability and elasticity of these regions comparable to regions that already have a curvature on account of the overall direction of the bead, for example in corner regions. Due to the wave-like extent, a wavelength can then be given. A portion of the bead arrangement extending in a wave-like manner preferably extends over at least two wavelengths.

Only in the regions directly adjacent to an inflection point of the wave-like extent of the bead arrangement do comparable conditions prevail at both flanks of the bead arrangement, in particular also in respect of elasticity and stability.

It is therefore advantageous when the opening in the bead flank connected on the exterior of the bead flank by the guide channel is arranged or formed in the region of an inflection point of the portion of the bead arrangement extending in a wave-like manner, for example in particular in those portions of the bead arrangement extending in a wave-like manner in which the bead arrangement extends in a straight line macroscopically. If, by contrast, a maximum length of the guide channel is to be attained with many design possibilities or a minimum length of the guide channel with a low pressure loss, the opening in the bead flank is thus preferably arranged or formed on a minimum or maximum (as considered from the guide channel) of the portion of the bead arrangement extending in a wave-like manner, i.e. for example where an amplitude of the deflection of the portion of the bead arrangement extending in a wave-like manner is maximal.

The separator plate can be formed as a bipolar plate with two individual plates connected to one another, wherein the bead arrangement and the guide channel are formed in at least one of the individual plates. The separator plate and/or the individual plates can be formed from metal, preferably from stainless steel. In order to improve the conductivity and in order to reduce the risk of corrosion, the individual plates can be coated at least in part. A thickness of the individual plates defined perpendicularly to the flat surface plane of the separator plate or the individual plates can be, in each case, between 50 μm and 150 μm, preferably between 70 μm and 110 μm. The bead arrangement, the guide channel, and the individual plate, in which the bead arrangement and the guide channel are formed, can be formed in one piece. For example, the bead arrangement and the guide channel can be formed integrally, in particular stamped, in the individual plate.

At least one of the flanks of the bead arrangement can have multiple openings, each of which is connected on the exterior of the bead arrangement by a guide channel of the previously described type, which widens in the direction of the bead arrangement at least in sections. An integrally bonded connection can be formed between the individual plates, between directly adjacent guide channels or at least between some of the guide channels arranged directly adjacently to one another, in the region of the separator plate between the directly adjacent guide channels. The integrally bonded connection can be a soldered connection, an adhesively bonded connection, or a welded connection, in particular a connection produced by laser welding. The connection can be provided over a continuous line or over individual short lines or at specific points. These integrally bonded connections make it possible to prevent the individual plates of the bead arrangement from splaying apart perpendicularly to the flat surface plane of the separator plate or the individual plates, in a region of the separator plate adjacent to the bead arrangement, when the separator plates of the stack are compressed along the bead arrangements perpendicularly to the flat surface planes of the separator plates.

The interconnected individual plates of the separator plate can be formed and arranged in such a way that they enclose a cavity arranged between the individual plates for the passage of a cooling medium. This cavity can be fluidically connected to the bead interior.

At least one of the individual plates can have a structure, on its surface facing away from the other individual plate of the same separator plate, for conducting a reaction medium. For example, the structure can comprise multiple channels, which are stamped in the individual plates. A channel structure in the active region of the separator plate is also referred to as a flow field. The individual plate can have a further channel structure between the flow field and the passage opening in the separator plate, which further channel structure is referred to as a distributor region. This structure for conducting the reaction medium is usually arranged on the side of the bead arrangement facing away from the passage opening in the separator plate. The structure can be fluidically connected to the bead interior via at least one opening in the individual plate, for example via an opening in the bead flank and a guide channel, connected to the opening, of the previously described type. The reaction medium is thus guided in above-mentioned structure from the outlet or to the inlet of the guide channel, specifically from or to the above-mentioned opening on an outer surface of the separator plate, whereas it is guided in the guide channel between the individual plates, i.e. in the interior of the separator plate.

The opening in the bead arrangement and guide channel of the above-described type connected to the opening can be arranged on a flank of the bead arrangement facing away from the passage opening of the separator plate and/or on a flank of the bead arrangement facing towards the passage opening of the separator plate.

The bead arrangement can be formed at least in part in such a way that the bead flanks each form an angle of less than 70 degrees, preferably of less than 60 degrees, particularly preferably of less than 50 degrees, with a vertical direction oriented perpendicularly to the flat surface plane of the separator plate. The bead roof can additionally have a convex curvature. In this embodiment of the bead arrangement, the bead flanks have a high rigidity, whereas the bead roof is resilient and deformable, in particular when the bead arrangement is compressed.

A height that the bead arrangement in the uncompressed state can be less than 800 µm, less than 600 µm, less than 500 µm, less than 450 µm, or less than 400 µm. As before, the height of the bead arrangement is given by the distance of the bead roof from the flat surface plane of the separator plate or the relevant individual plate.

An electrochemical system comprising multiple separator plates of the type proposed herein is additionally proposed. The electrochemical system for example can be a fuel cell system, an electrochemical compressor, a humidifier for a fuel cell system, or an electrolyser. The separator plates of the electrochemical system are typically arranged in a stacked manner and are designed such that the passage openings of the separator plates form at least one media channel, which is designed to feed a medium to the stack or to discharge a medium from the stack.

BRIEF DESCRIPTION OF THE DRAWINGS

Exemplary embodiments of the invention are shown in the drawings and will be explained in greater detail in the following description. Although corners might be shown in part without radii, they in practice always have at least a small radii. Some examples of separator plates according to the invention will be provided hereinafter. Here, a multiplicity of advantageous features of a separator plate according to the invention will be presented in conjunction with one another. These individual optional features, however, can develop the present invention not only jointly, but also individually or in combination with other optional features from other examples. Like or similar reference signs will be used hereinafter for like or similar elements, and therefore the description of said elements sometimes is not repeated. In the drawings:

FIG. 4b shows a sectional illustration of the bead feedthrough from FIG. 4a;

DETAILED DESCRIPTION OF THE INVENTION

Figure 1:
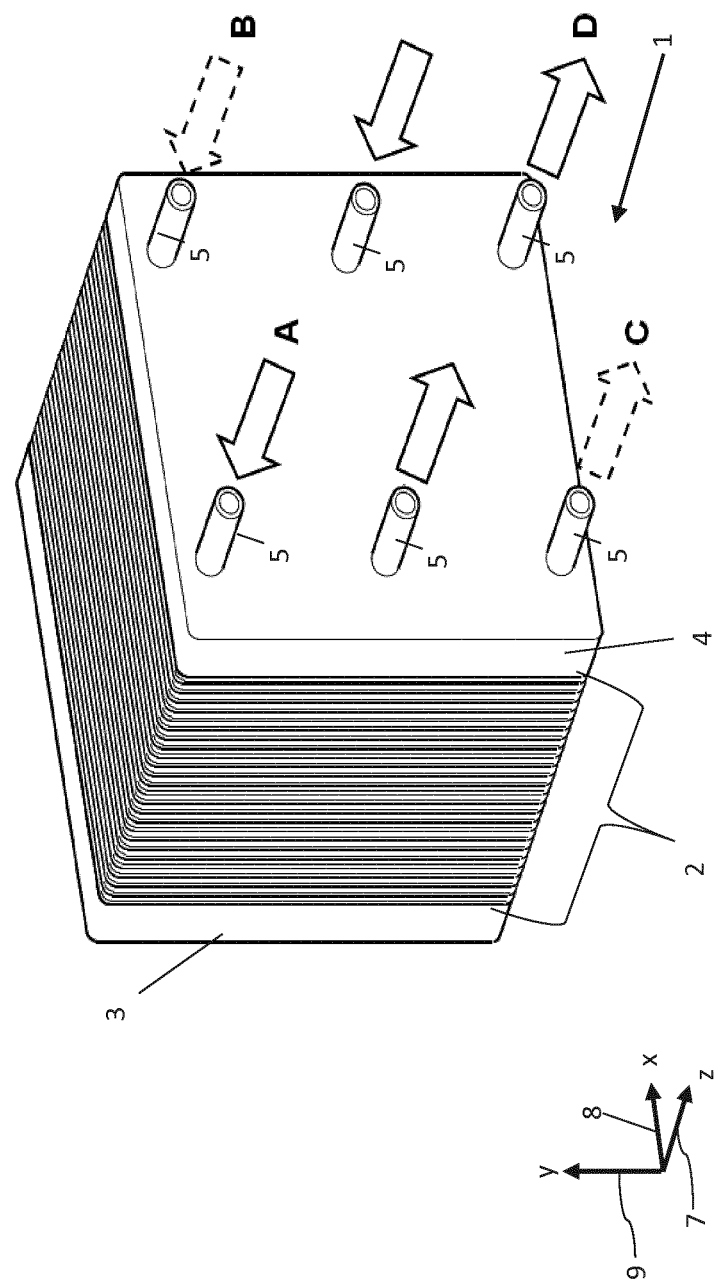
FIG. 1 shows a fuel cell system with multiple stacked separator plates in a perspective view.

FIG. 1 shows an electrochemical system 1 according to the invention, comprising a stack 2 of separator plates of identical design, which are stacked along a z-direction 7 and are clamped between two end plates 3, 4. The separator plates are formed here as bipolar plates and each comprise two individual plates connected to one another. In the present example, the system 1 is a fuel cell stack. Each two adjacent bipolar plates of the stack 2 thus enclose therebetween an electrochemical cell designed to convert chemical energy into electrical energy. In alternative embodiments the system 1 can also be formed as an electrolyser, electrochemical compressor, or as a humidifier for a fuel cell system. Separator plates are likewise used in those electrochemical systems. The structure of these separator plates corresponds to the structure of the bipolar plates explained here in greater detail, even if the media guided on or through the separator plates differ.

The z-axis 7, together with an x-axis 8 and a y-axis 9, spans a right-handed Cartesian coordinate system. The end plate 4 has multiple ports 5, by means of which media can be fed to the system 1 and by means of which media can be discharged from the system 1. These media that can be fed to the system 1 and that can be discharged from the system 1 can comprise, for example, fuels such as molecular hydrogen or methanol, reaction gases such as air or oxygen, reaction products such as steam or oxygen-depleted air, or cooling medium such as water and/or glycol.

Figure 2:
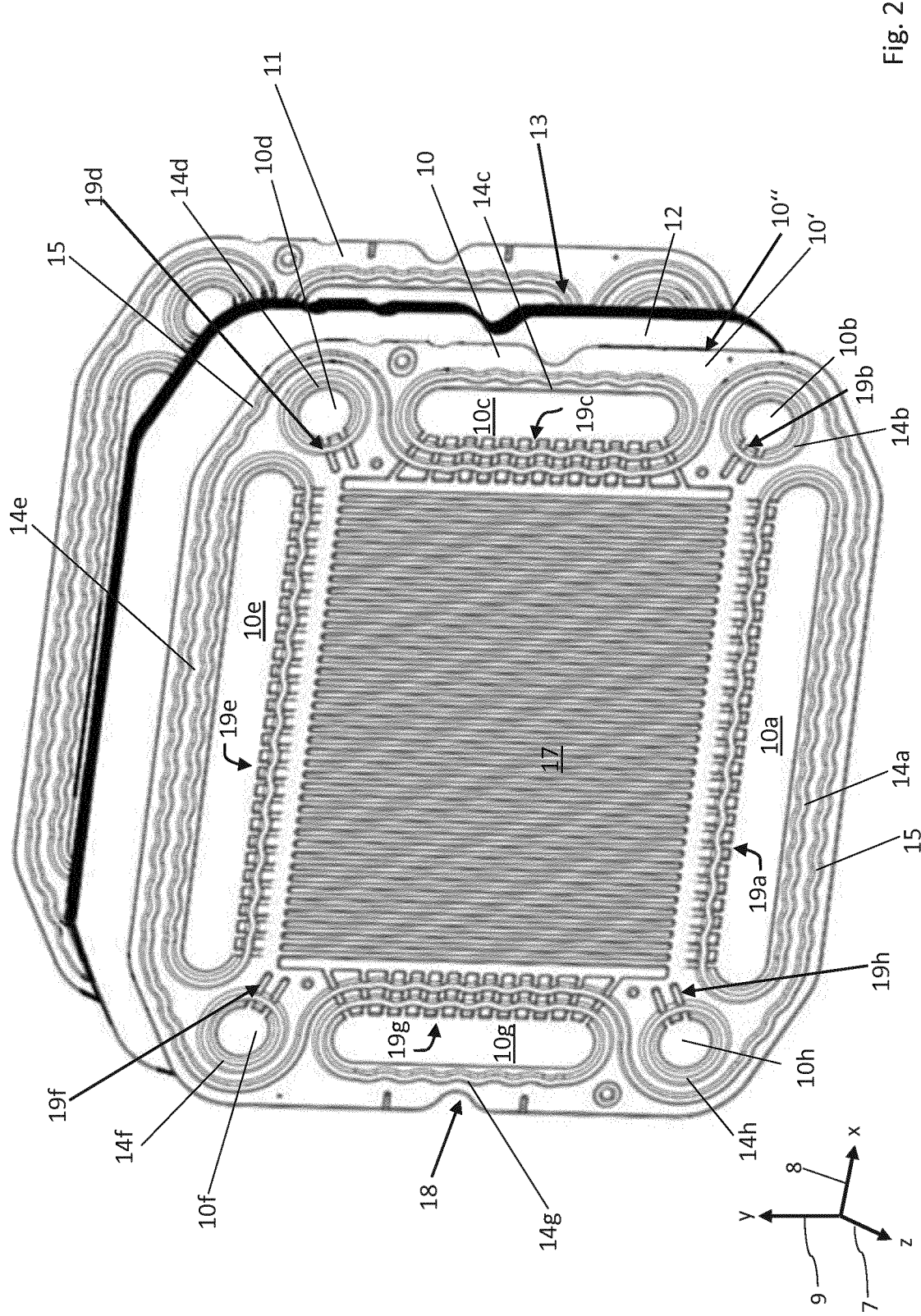
FIG. 2 shows a perspective view of two directly adjacent separator plates of the stack from FIG. 1 and a membrane electrode unit arranged therebetween.

FIG. 2 shows two directly adjacent separator plates 10, 11 of the stack 2 from FIG. 1. Here and hereinafter, repeating features are denoted in each case by the same reference sign. The separator plates 10, 11 are formed identically. Hereinafter, only the separator 10 will therefore be described in detail. It is thus representative for the separator plates of the stack 2.

The flat surface plane of the separator plate 10 is oriented along the x-y plane.

Here, the separator plates 10 are formed from two metal individual plates 10', 10" joined together (see also FIG. 4). In FIG. 2, however, only the first individual plate 10' of the separator plate 10 facing towards the viewer is visible. The individual plates 10', 10" of the separator plate 10 are fabricated from stainless steel sheets, which for example each have a thickness, defined perpendicularly to the flat surface plane of the individual plates, of 80 µm. The individual plates 10', 10" can be welded to one another along their rear sides facing towards one another, in particular welded, soldered or adhesively bonded to one another in part, in order to form the separator plate 10. For example, the individual plates 10', 10" can be connected by connections produced by laser welding.

A membrane electrode unit (membrane electrode assembly, MEA) 12 is arranged between the separator plates 10, 11. The MEA 12 can comprise a polymer electrolyte membrane (PEM) and one or more gas diffusion layers (GDL). The GDL are usually oriented towards the separator plates 10, 11 and for example are formed as carbon mats. The sides of the separator plates 10, 11 facing towards one another enclose an electrochemical cell 13 in the compressed state. In the case of humidifiers for fuel cell systems, the cell 13 is formed by a substantially gas-impermeable, but water-permeable membrane, which can be supported by supporting media, and by at least one diffusion medium, preferably a diffusion medium on either side, formed from a textile or carbon mat.

The separator plate 10 has multiple passage openings 10a-h. The MEA 12 has corresponding passage openings, which are aligned with the passage openings 10a-h of the separator plate 10 and with corresponding passage openings of the other separator plates of the stack 2, so that the passage openings form media channels once the stack 2 has been compressed, which media channels are each fluidically connected to one of the ports 5 from FIG. 1 respectively. These media channels are used to feed media into the electrochemical system 1 and to discharge media from the electrochemical system 1.

In order to seal off the passage openings 10a-h or in order to seal off the media channels formed by the passage openings 10a-h, bead arrangements are formed in the separator plate 10, which bead arrangements are arranged around the passage openings 10a-h. The first individual plate 10' of the separator plate 10 facing away from the separator plate 11 thus has bead arrangements 14a-h around the passage openings 10a-h. The bead arrangements 14a-h encircle the passage openings 10a-h, in each case fully. The second individual plate 10" of the separator plate 10 facing towards the separator plate 11 and hidden from view in FIG. 2 has corresponding bead arrangements around the passage openings 10 a-h. An additional bead arrangement 15 of the separator plate 10 encircles the passage openings 10a-b, 10d-f and 10h fully.

The bead arrangements of the separator plate 10 are each formed here in one piece with the individual plates 10', 10". The bead arrangements of the individual plates 10', 10" are usually formed integrally, in particular stamped, in the individual plates. The bead arrangements formed in the individual plates, in the uncompressed state, each have a height perpendicularly to the flat surface plane of the individual plates 10', 10" of just 450 µm, or even of just 400 µm. The height of the bead here in each case denotes the distance of the highest point of the bead roof from the flat surface plane of the relevant individual plate on the surface pointing towards the bead roof. This extremely small bead height contributes advantageously to the compactness of the stack 2 of the system 1.

It can also be seen in FIG. 2 that the first individual plate 10' of the separator plate 10, on its front side facing away from the second individual plate 10" of the separator plate 10, has a structure 17 for conducting reaction medium. The structure 17 comprises multiple channels, which are stamped in the individual plate 10'. The structure 17 is surrounded fully on all sides by the bead arrangement 15, so that the bead arrangement 1 seals the structure 17 with respect to the surrounding environment. The structure 17 is part of an active region of the individual plate 10'. This active region delimits a further electrochemical cell, which is arranged between the separator plate 10 and a further separator plate, which is not illustrated in FIG. 2 but is arranged directly adjacently to the separator plate 10 in the positive z-direction 7. The second individual plate 10" of the separator plate 10 has, on its front side facing away from the first individual plate 10', a structure corresponding to the structure 17 for conducting reaction medium.

The individual plates 10', 10" are formed and arranged in such a way that they enclose therebetween a cavity 18 for passage of a cooling medium. The cavity 18 is in particular arranged between the individual plates 10', 10" in such a way that heat from the active regions of the individual plates 10', 10" can be dissipated by means of the cooling medium guided through the cavity 18.

The individual plates 10', 10" also have feedthroughs 19a-h, which are designed for the metered passage or conductance of media (for example fuels, reaction gases, reaction products or cooling medium) through the bead arrangements 14a-h, 15. Some of the feedthroughs 19a-h, specifically the feedthroughs 19c and 19g, produce a fluidic connection between the passage openings 10c and 10g (or the media channels formed thereby) and the cavity 18 between the individual plates 10', 10". Some of the feedthroughs, specifically the feedthroughs 19a and 19e, produce a fluidic connection between the passage openings 10a and 10e (or the media channels formed thereby) and the flow field 17, facing towards the viewer, of the active region of the individual plates 10', 10" of the separator plate 10. The other feedthroughs 19b, 19d, 19f and 19h produce a fluidic connection between the passage openings 10b, 10d, 10f and 10h (or the media channels formed thereby) and the flow field 17, facing away from the viewer, of the active region of the individual plates 10', 10" of the separator plate 10. Details of the feedthroughs 19a-h will be explained with reference to the following figures.

Figure 3:
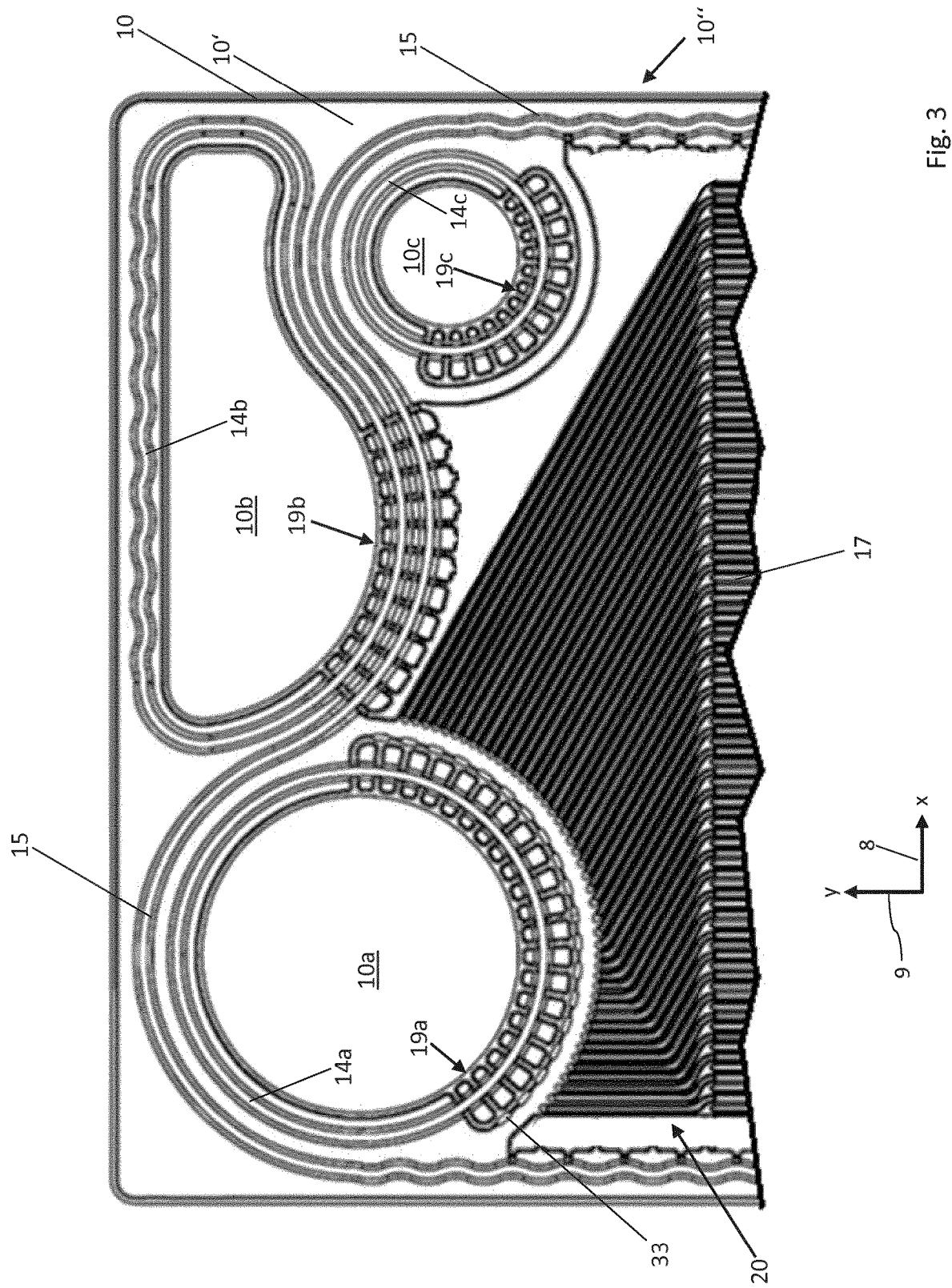
FIG. 3 shows a further exemplary embodiment of a separator plate in a plan view.

FIG. 3 shows a modified embodiment of the separator plate 10 with the metal individual plates 10', 10" joined together. The front side of the first individual plate 10' is facing towards the viewer. The passage openings 10a-c in the separator plate 10 can be seen, as can the bead arrangements 14a-c arranged around the passage openings 10a-c in order to seal the passage openings 10a-c, these bead arrangements being stamped in the first individual plate 10'. The bead arrangement 15 for sealing the active region of the first individual plate 10' is shown in part. The embodiment of the separator plate 10 according to FIG. 3 additionally has a distributor structure 20. This comprises multiple channels stamped in the front side of the individual plate 10' and produces a fluidic connection between the passage opening 10a and the active region of the individual plate 10', which in FIG. 3 is connected to the distributor structure 20 at the lower edge of the image. The bead arrangements 14a-c in turn have feedthroughs 19a-c for conducting media through the bead arrangements 14a-c. It is clear that the medium of the passage opening 10b—this being cooling medium here in particular—must pass through both the bead 14b and the bead 15. This medium is guided continuously on the side of the individual plate 10' facing away from the viewer. The media guided from the passage opening 10a, between the individual plates 10', 10", and through the opening 19a transversely to the bead arrangement 14a, enters the distributor structure 20 facing towards the viewer via the opening 33 (for example see FIGS. 5 to 7). The media discharged from the distributor structure (not visible) on the opposite surface of the separator plate 10 enters a guide channel between the individual plates 10' and 10" through an opening formed in the second individual plate 10" and crosses the bead 14c via the feedthrough 19c, and flows on into the passage opening 10c.

Figure 4A:
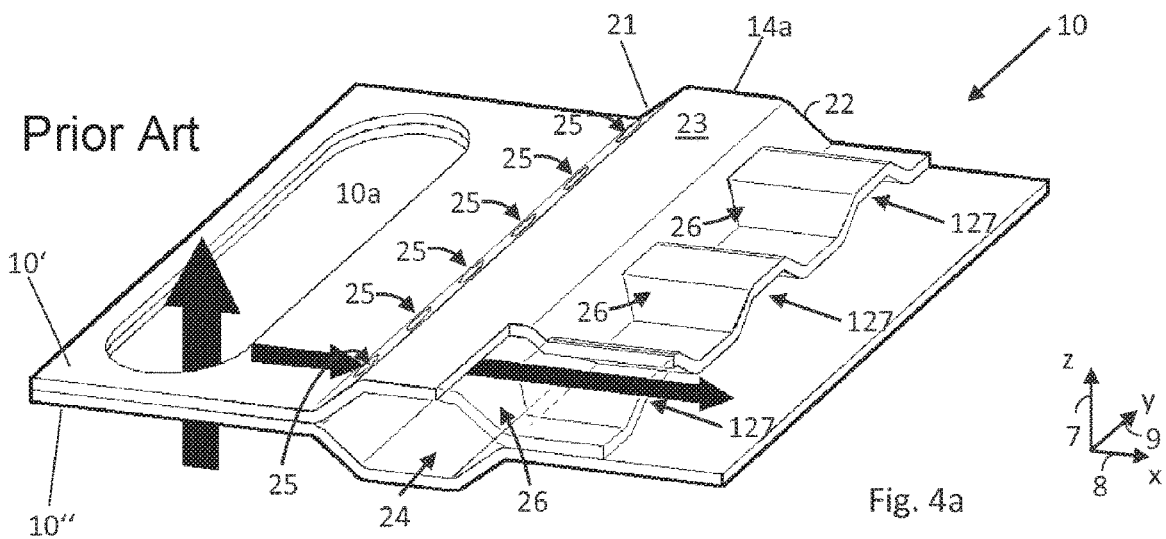
FIG. 4a shows a perspective view of a feedthrough through a bead arrangement of a separator plate with guide channels connected to the bead arrangement in accordance with the prior art.
Figure 4B:
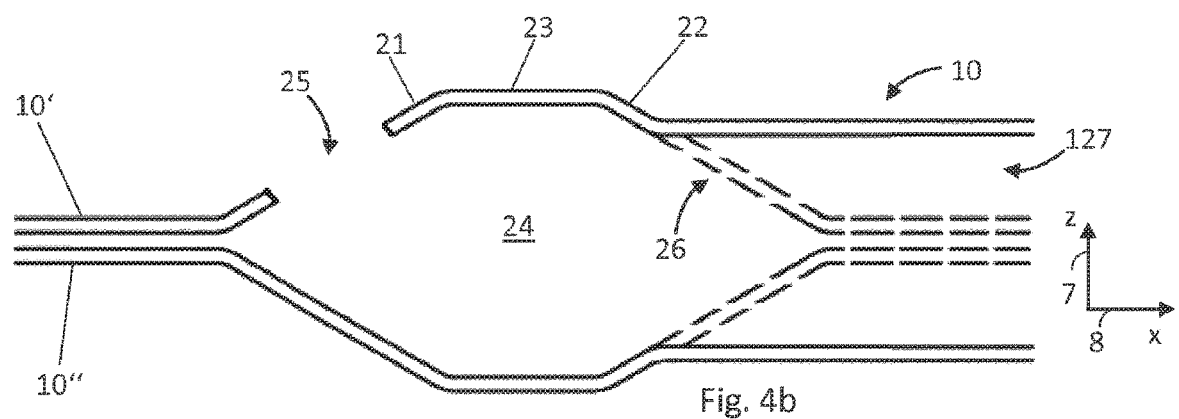
Figure 4C:
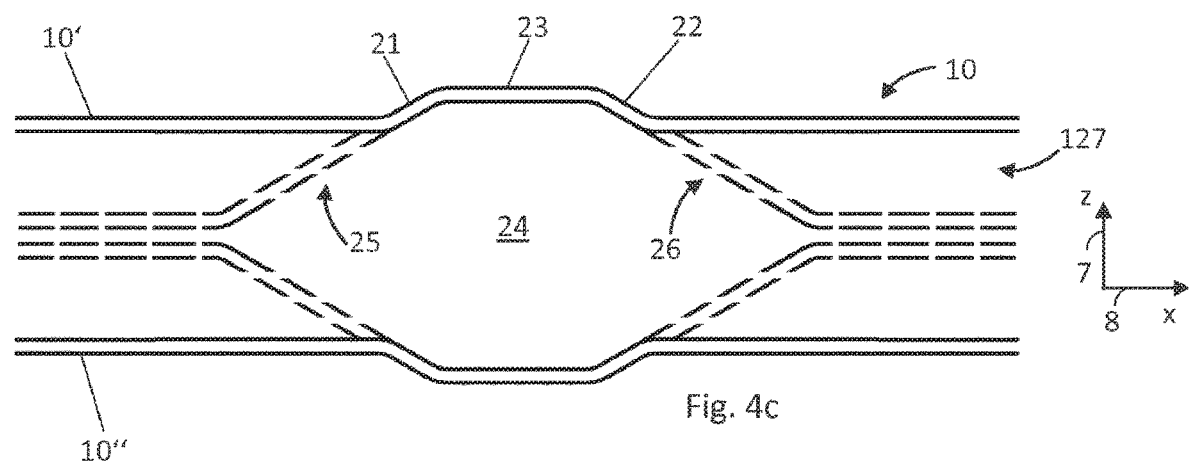
FIG. 4c shows a sectional illustration of a further bead feedthrough with guide channels according to the prior art.

FIG. 4a shows a detail of the separator plate 10 in a perspective view. The bead arrangement 14a stamped in the first individual plate 10' has two bead flanks 21, 22 and a bead roof 23. A bead interior 24 is arranged between the bead flanks 21, 22 and the bead roof 23 and is delimited by the bead flanks 21, 22 and the bead roof 23. The bead flank 21 facing towards the passage opening 10a has multiple openings 25 for conducting a medium through the bead flank 21. The passage opening 10a is fluidically connected to the bead interior 24 via the openings 25. The bead flank 22 facing away from the passage opening 10a has openings 26 for conducting a medium through the bead flank 22. On the exterior of the bead arrangement 14a facing away from the second individual plate 10", the openings 26 are connected to guide channels 127, which are not according to the invention and which are fluidically connected via the openings 26 to the bead interior 24. A medium guided in the media channel 10a can thus be guided through the bead arrangement 14a via the openings 25, 26 and the channels 127, and for example can be selectively guided into the active region of the individual plates 10', as is indicated on the basis of the arrows. The guide channels 127 not according to the invention have a constant width, wherein the width of the guide channels 127 in FIG. 4a is determined in each case parallel to the y-direction 9 at half height of the guide channels 127. FIG. 4b shows a sectional illustration of the bead arrangement 14a according to FIG. 4a, wherein the plane of section is oriented along the x-z plane and runs in the longitudinal direction through a guide channel 127 not according to the invention. FIG. 4c shows a sectional illustration of a modified embodiment of the bead arrangement 14a, in which guide channels 127 not according to the invention are connected to both bead flanks 21, 22.

In order to make the stack 2 of the separator plates of the system 1 as compact as possible, it is desirable to form the bead arrangement 14a and the other bead arrangements of the separator plate 10 as flat as possible. In this case the openings 24, 26 in the bead flanks 21, 22, however, can be detrimental to the stability and resilience and thus the sealing effect of the bead arrangement 14a. This could be compensated for, as appropriate, by making the openings 25, 26 smaller. A reduction in size of this kind, however, would also result in an undesirable reduction in size of the media flow through the bead arrangement.

An embodiment according to the invention of the feedthroughs 19a-h through the bead arrangements 14a-h, 15 according to FIGS. 2 and 3, which ensures a sufficiently large media flow through the bead arrangements 14a-h, 15 without detriment to the stability and resilience of the bead arrangements 14a-h, 15, will be presented hereinafter by way of example with reference to FIGS. 5-9 for the bead feedthrough 19a through the bead arrangement 14a of the individual plate 10' of the separator plate 10.

Figure 5:
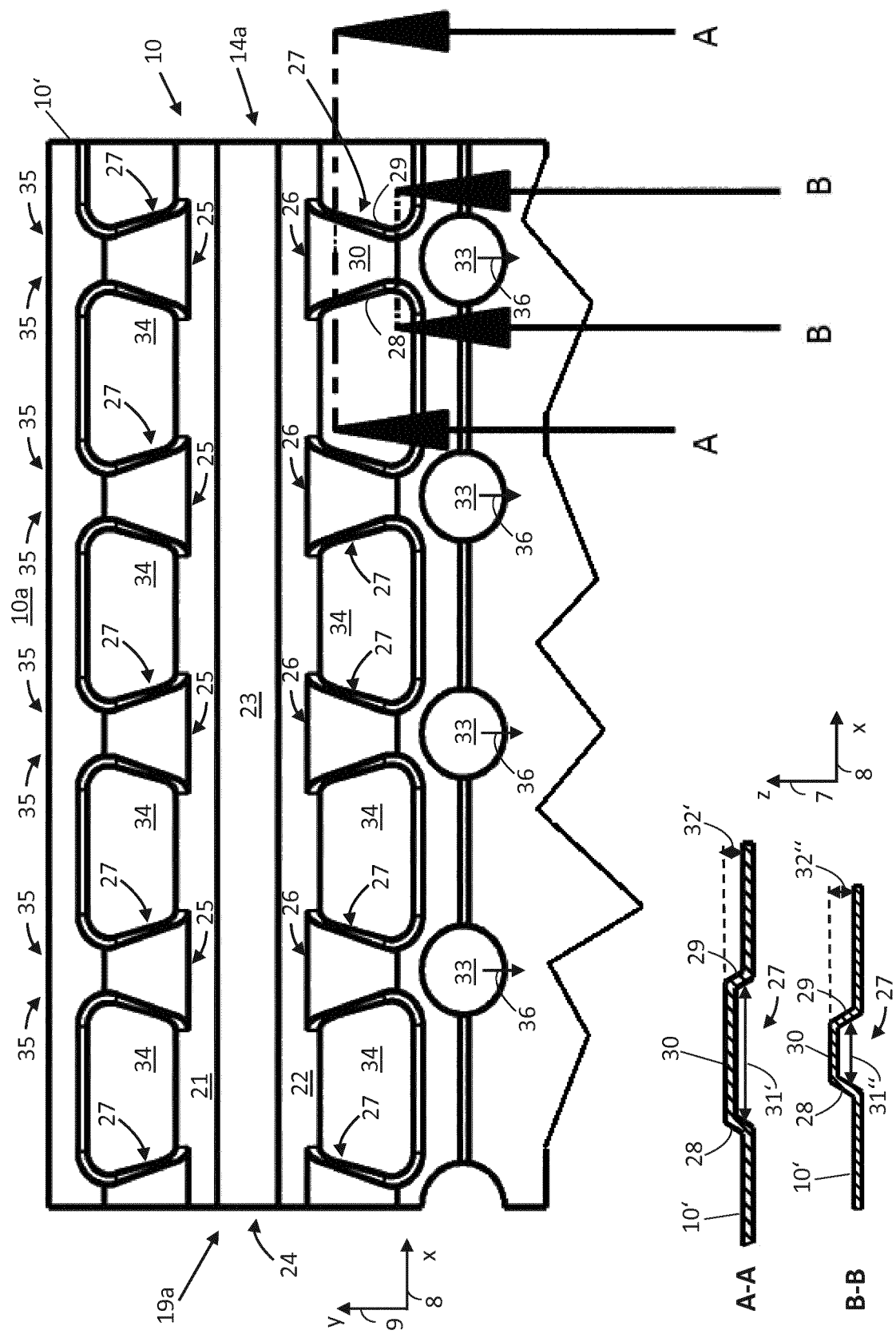
FIG. 5 shows an embodiment of a bead feedthrough with guide channels according to the invention in a plan view.

FIG. 5 shows a detail of the front side of the first individual plate 10' of the separator plate 10, said front side facing away from the second individual plate 10". What is shown is in particular a portion of the bead arrangement 14a, which is stamped in the first individual plate 10'. The individual plate 10' and the bead arrangement 14a are formed in one piece. The bead arrangement 14a comprises a first bead flank 21 facing towards the passage opening 10a at the upper edge of the image, a second bead flank 22 facing away from the passage opening 10a, and a bead roof 23 connecting the bead flanks 21, 22. The first bead flank 21 has multiple openings 25 for conducting a medium through the first bead flank 21. The second bead flank has multiple openings 26 for conducting a medium through the second bead flank 22.

The passage opening 10a, at the upper edge of the image, is fluidically connected via the openings 25 to the bead interior 24 enclosed or delimited by the bead flanks 21, 22 and the bead roof 23. A medium (for example a fuel such as molecular hydrogen, a reaction gas such as molecular oxygen, a reaction product such as steam, or a cooling medium) can thus be guided from the passage opening 10a, between the individual plates 10', 10", via the openings 25, into the bead interior 24. This is indicated in FIG. 5 by arrows. As appropriate, the media can also flow in the reverse direction, that is to say against the direction indicated by the arrows 35.

In order to conduct the medium from the passage opening 10a selectively and in a metered manner to the openings 25 and through the bead flank 21, guide channels 27 according to the invention are connected, on the exterior of the bead arrangement 14a facing away from the second individual plate 10" (hidden in FIG. 5), to the openings 25 and the first bead flank 21. The guide channels 27 are designed to guide a medium between the individual plates 10', 10". The guide channels 27 between the passage opening 10a and the openings 25 in the first bead flank 21 extend in each case from the passage opening 10a to the openings 25 and the first bead flank. Exactly one guide channel 27 according to the invention is connected to each of the openings 25 in the first beat flank 21.

The bead interior 24 is for example fluidically connected via the openings 26 and the second bead flank 22 to the active region (not shown here) of the first individual plate 10'. The active region for example can be connected at the lower end of the image. In order to conduct the medium selectively and in a metered manner from the bead interior 24 to the active region, guide channels 27 according to the invention are again connected, on the exterior of the bead arrangement 14a facing away from the second individual plate 10", to the openings 26 in the second bead flank 26. Precisely one guide channel 27 according to the invention is connected to each of the openings 65 in the second bead flank 22.

In FIG. 5 the guide channels 27 extend between the openings 26 in the second bead flank 22 and the active region, in each case from the openings 26 in the second bead flank 22 to an outlet or inlet 33 of the particular guide channel 27. The outlet or inlet 33 thus in each case forms an end of the guide channel 27 facing away from the bead arrangement 14a. The media can escape from the guide channel 27 at the outlet or inlet 33 and in so doing change to the opposite surface of the individual plate 10'. This is indicated in FIG. 5 by arrows 36. As appropriate, the media can also flow in the reverse direction, i.e. against the direction indicated by the arrows 36. The active region of the individual plate 10' can thus be fluidically connected to the bead interior 24 by the inlets or outlets 33. The inlets or outlets 33 are formed as passage openings and the individual plate 10'.

The guide channels 27 are formed in one part or one piece with the individual plate 10'. For example, the guide channels 27 are formed integrally in the individual plate 10', in particular stamped therein. Both the bead arrangement 14a and the guide channels 27 are usually formed in one piece with the individual plates 10' and are stamped therein.

The guide channels 27 usually each have side flanks 28, 29 and a roof 30. The guide channels 27 according to the invention differ from the guide channels 127 according to the prior art (see FIGS. 4a-c) in that there width 31', 31" increases in each case in the direction of the bead arrangement 14a at least in sections. The width 31', 31" of the guide channels 27 is determined here in each case parallel to the flat surface plane of the individual plate 10' at half height of the guide channel 27. In FIG. 5 the width 31', 31" of the guide channels 27 is determined in each case parallel to the direction of extent of the bead arrangement 14a, which runs along the x-direction 8. The width 31', 31" of the guide channel 27 is thus typically determined perpendicularly to the direction of flow of the medium through the guide channel 27.

It can be seen in FIG. 5 that the width 31', 31" of the guide channels 27 increases in a fan-like manner in the direction of the bead arrangement 14a at least in sections. The width 31', 31" of the guide channels thus increases at least in sections strictly monotonically, here in particular linearly. For example, the greatest width of the guide channel 27 is at least 1.5 times the smallest width of the guide channel. In modified exemplary embodiments the greatest width of the guide channel 27 is usually at least 110% or at least 120% of the smallest width of the guide channel 27. In FIG. 5 the portion of the guide channels 27 reaching as far as the bead arrangement 14a and in which the width 31', 31" of the guide channels 27 increases strictly monotonically extends in each case over a length that is at least two thirds or at least half the length of the guide channel 27 in question.

At the same time, the guide channels 27 in FIG. 5 are designed such that a height 32', 32" of the guide channels 27 determined perpendicularly to the flat surface plane of the separator plate 10 or the individual plate 10' decreases in the direction of the bead arrangement 14a at least in sections. The height 32', 32" of the guide channels 27 here denotes in each case the distance of the roof 30 of the guide channel 27 from the flat surface plane of the separator plate 10 or the individual plate 10'. In FIG. 5 the portion of the guide channels 27 reaching as far as the bead arrangement 14a and in which the height 32', 32" of the guide channels 27 decreases strictly monotonically extends in each case over a length that is at least two thirds or at least half of the length of the guide channel 27 in question. Here, the height 32', 32" of the guide channels 27 decreases linearly at least in sections.

By way of example, two sectional illustrations of one of the guide channels 27 are shown in FIG. 5 at two different positions along the extent of this guide channel 27. The plane of section is in each case oriented parallel to the x-z plane and thus perpendicularly to the flat surface plane of the separator plate 10 or the individual plate 10'. The planes of section are perpendicular to the direction of media flow through the guide channel 27. The plane of section shown by the straight line A-A is arranged at a first distance from the bead arrangement 14a, and the plane of section marked by the straight line B-B is arranged at a second distance from the bead arrangement 14a, wherein the first distance is smaller than the second distance. In the plane of section B-B the guide channel 27 has a width 31" and a height 32", and in the plane of section A-A the guide channel 27 has a width 31" and a height 32". The width 31' is greater than the width 31", and the height 32' is smaller than the height 31". The radii at the respective ends of the guide channels, extending between the bead flank 22 and the plane of section A-A and also on the side of the plane of section B-B facing away from the bead arrangement 14a, can be clearly seen in the plan view of FIG. 5.

The guide channels 27 are designed such that their cross-sectional area is substantially constant at least along the middle third of the extent of the guide channel in question. For example, the guide channels 27 are designed such that their cross-sectional area, at least along the middle third of their extent, changes by 20% at most, preferably by 15% at most, or by 10% at most compared to the largest cross-sectional area in the middle third (the cross-sectional illustrations of FIG. 5 are not necessarily true to scale in this respect).

In order to have minimal influence on the mechanical stability and elasticity of the bead arrangement 14a, the openings 25, 26 reach into the bead flanks 21, 22 perpendicularly to the flat surface plane of the separator plate 10 or the individual plate 10' up to a height that is at most 80% or at most 70% of the height of the bead roof 23. The height of the bead roof 23 here denotes the distance of the bead roof 23 from the flat surface plane of the separator plate 10 or the individual plate 10'. The heights shall be determined in each case in the uncompressed state of the separator plate 10 or individual plate 10'. The guide channels 27 are also designed such that the greatest height of their roof 30 is at most 85% or at most 75% of the height of the bead arrangement 14*a*, wherein the heights shall be determined again in the uncompressed state.

The individual plate 10' is connected to the second individual plate 10" in an integrally bonded manner in flat regions 34 of the individual plates 10' between two directly adjacent guide channels 27. In particular, the individual plates 10', 10" of the separator plate 10, in the regions 34 or in some of the regions 34, are connected in regions by connections produced by laser welding. This prevents the individual plates 10', 10" from splaying apart perpendicularly to the flat surface plane of the separator plate 10 under compression of the separator plate 10. Under compression of the separator plate 10, the compressive forces typically act perpendicularly to the flat surface plane of the separator plate 10 in the region of the bead arrangement 14*a*.

In FIG. 5 the bead arrangement 14*a* runs in a straight direction. The bead arrangement 14*a* and the bead feedthrough 19*a* according to FIG. 6 differ from the bead arrangement 14*a* and from the bead feedthrough 19*a* according to FIG. 5 in that the bead arrangement 14*a* according to FIG. 6 extends in a wave-like manner, both in FIG. 6*a* and in FIG. 6*b*, in particular in the manner of a sine curve of constant amplitude. With regard to a straight line oriented parallel to the x-axis 8, the bead arrangement 14*a* according to FIG. 6 thus has a periodic extent. Markings 37 are arranged here at a distance of a half wavelength or period length. The markings 37 denote the inflection points in the flanks 21, 22 of the bead arrangement 14*a* in which the openings 25, 26 are arranged.

Figure 6A:
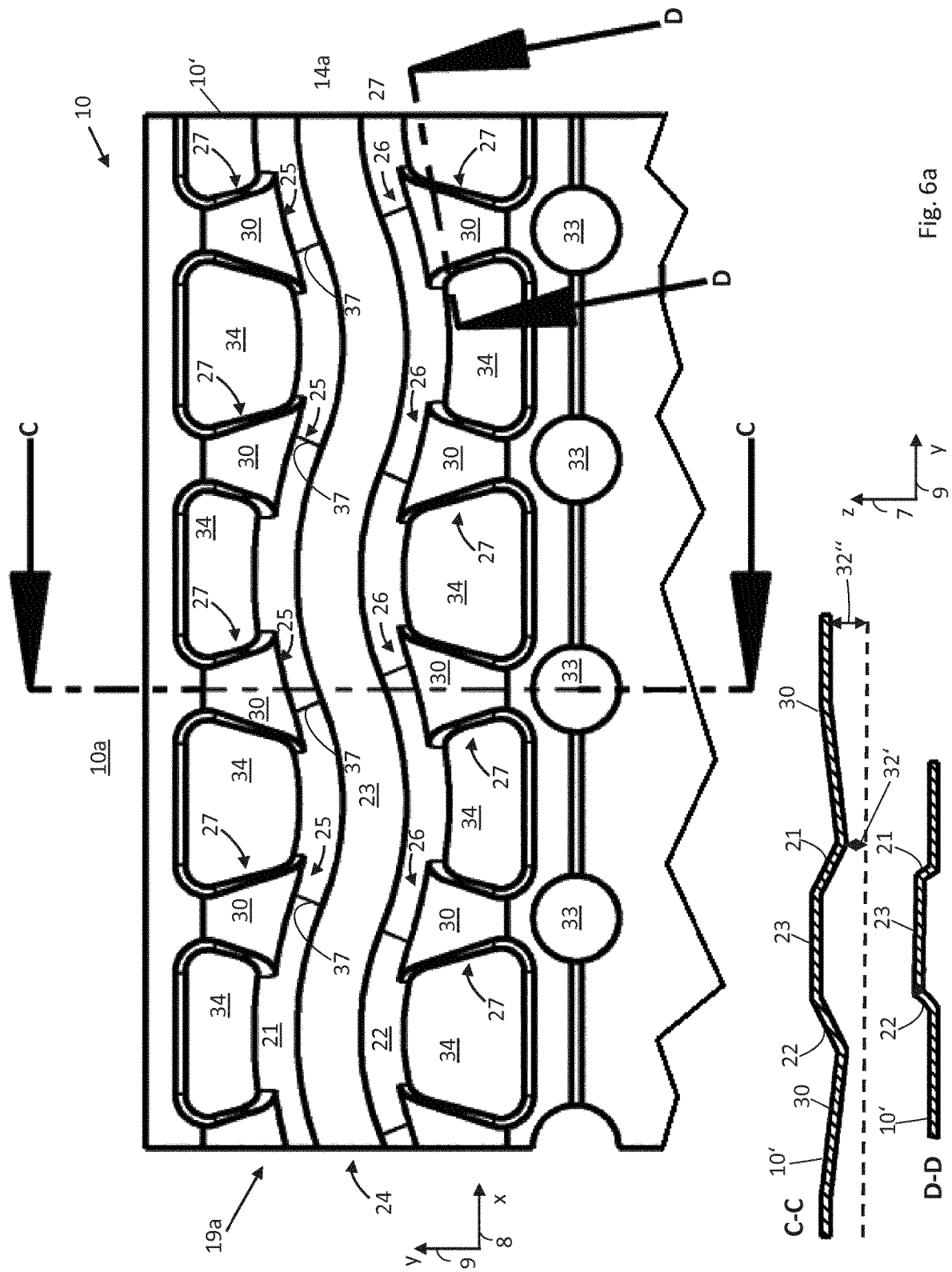
FIGS. 6-7 show further embodiments of a bead feedthrough with guide channels according to the invention, in a plan view.
Figure 6B:
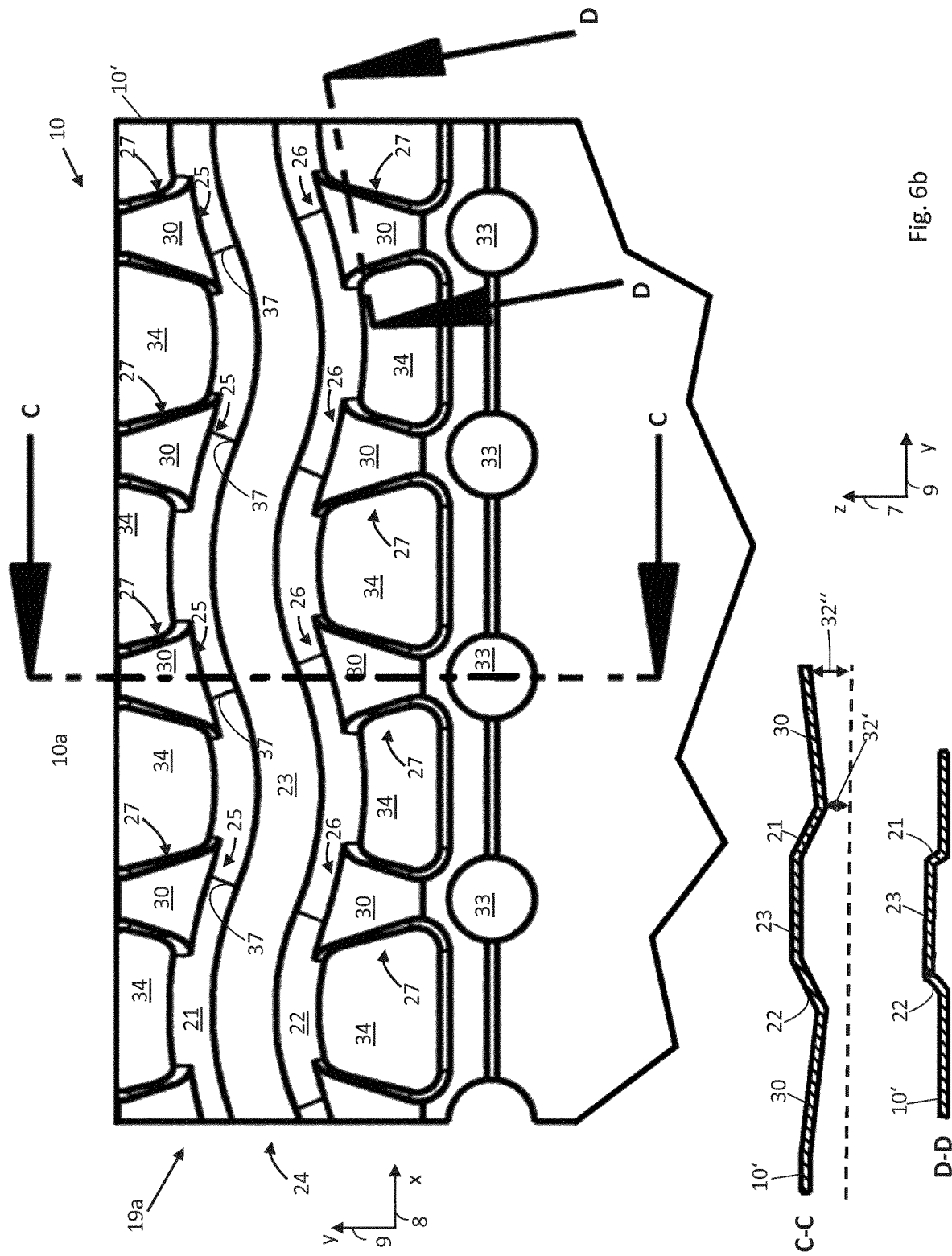

In FIG. 6, in both sub-FIGS. 6*a* and 6*b*, two sectional illustrations of the bead feedthrough 19*a* are again shown. The plane of section shown by the straight line C-C is oriented parallel to the y-z axis, and the plane of section shown by the straight line D-D is oriented perpendicularly to the x-y plane and, with the x-direction 8, forms an angle of approximately 20 degrees. The plane of section C-C extends along the longitudinal direction of 1 of the guide channel 27. The heights 32', 32" of the roof 30 decreasing strictly monotonically in the direction of the bead arrangement 14*a* at least in sections can be seen. The height of the guide channel 27 assumes its smallest value 32' at the transition into the bead flank 21. The greatest height 32" of the channel roof 30 reaches as far as a value that here is approximately 70% of the height of the bead roof 23. The embodiments of sub-FIGS. 6*a* and 6*b* differ in that in sub-FIG. 6*a* a region in which the two individual plates 10', 10" extend substantially parallel to one another is connected to the guide channels 27 in the transition to the passage opening 10*a*. The media thus enter and exit over the entire way, also between the extensions of the guide channel 27. A transition of this kind is absent in the embodiment of sub-FIG. 6*b*, in which therefore the media enter and exit the guide channels 27 directly. In both embodiments the media enters and exits from the passage opening 10*a* between the individual plates 10', 10". The media enter and exit the flow field 17 on the surface of the separator plate 10 facing towards the viewer, through the openings 33.

Figure 7:
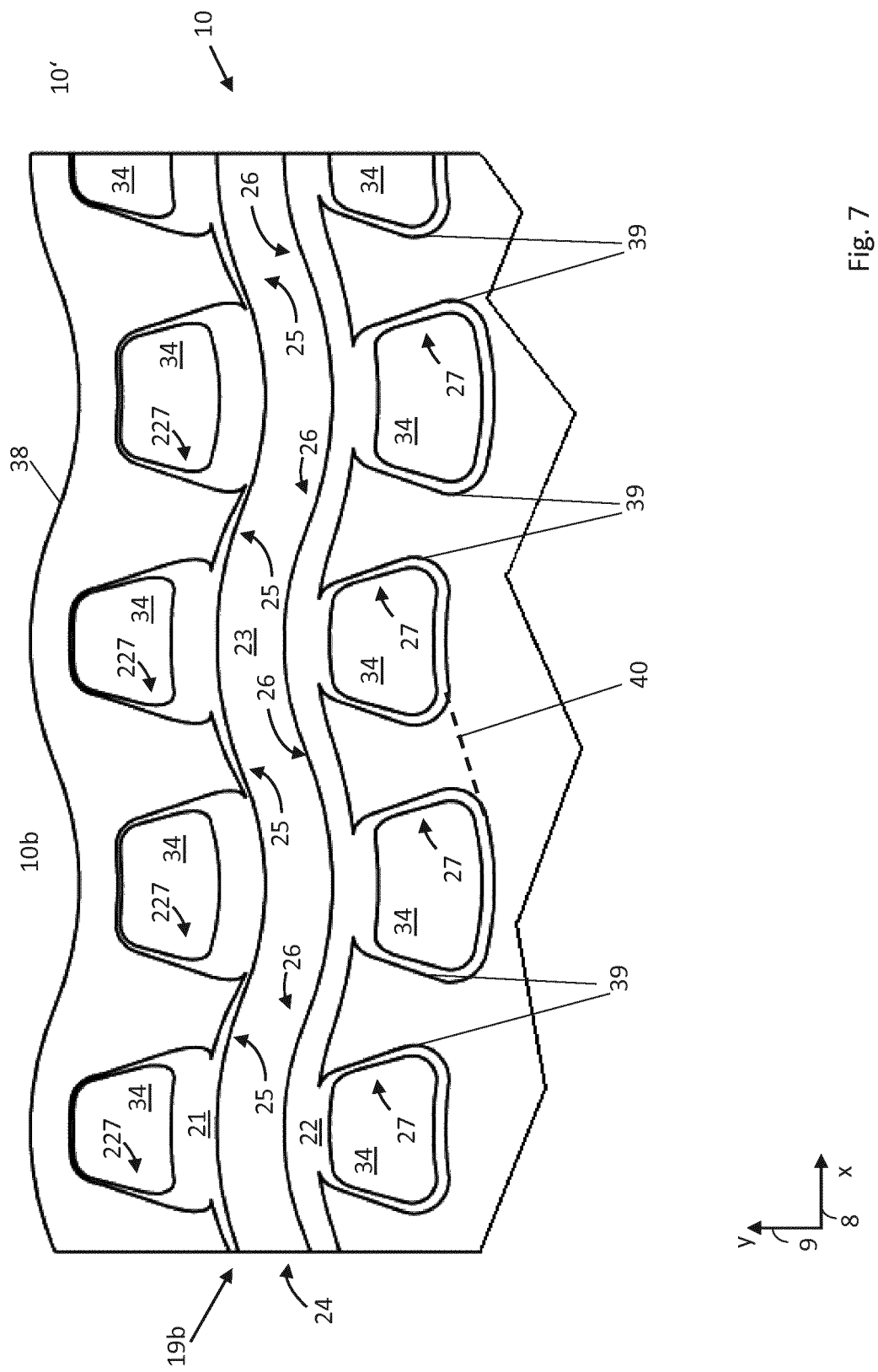

The bead feedthrough 19*b* according to FIG. 7 differs from the bead feedthrough 19*a* according to FIG. 6 in that an edge 38 of the individual plate 10' reaching as far as the passage opening 10*a* and delimiting the passage opening 10*a* extends in a wave-like manner in sections, in particular in the manner of a sine curve. Both the bead arrangement 14*a* and the edge 38 thus extend in a wave-like manner. The portion of the bead arrangement 14*a* extending in a wave-like manner and the portion of the edge 38 extending in a wave-like manner each extend over at least two wavelengths. In the example of FIG. 7, the portion of the bead arrangement 14*a* extending in a wave-like manner and the portion of the edge 38 extending in a wave-like manner each have the same wavelength.

In the examples of FIGS. 5-6 guide channels 27 according to the invention are arranged both on the bead flank 21 facing towards the passage opening 10*a* and on the bead flank 22 facing away from the passage opening 10*a*, and each widen as described in the direction of the bead arrangement 14*a*. In modified embodiments of the separator plate 10, as in FIG. 7, the guide channels 27 according to the invention are arranged only on one of the bead flanks 21, 22, in the example of FIG. 7 on the bead flank 22. In the example of FIG. 7, the guide channels 227 have a deviating geometry at the bead flank 21, in which case the width of the guide channels 227 increases starting from the bead flank 21, and the height at the same time decreases in the direction of the passage opening 10*b*. It is also conceivable that only some of the bead arrangements 14*a-h* comprise the guide channels 27 according to the invention, whereas other of the bead arrangements 14*a-h* do not have any guide channels 27 according to the invention.

Apart from the geometry, not according to the invention, of the guide channel 227, the medium is guided between the passage opening 10*b* and the bead interior 24 as in the above-described embodiments. Here, however, in contrast to that described in the embodiments above, the bead interior 24 is fluidically connected via the openings 26 in the second bead flank 22 to the previously described cavity 18, which is arranged between the individual plates 10', 10" and is designed for the passage of a cooling medium between the individual plates 10', 10". Here, it is thus possible to dispense with an opening 33. The radius 39 leads towards the end 37 of the guide channel 27.

FIGS. 8*a-f* show sectional illustrations of different embodiments of the guide channels 27 according to the invention from FIGS. 5-7. The planes of section are oriented in each case perpendicularly to the flat surface plane of the individual plate 10' and perpendicularly to the media flow direction through the guide channel 27. The shown planes of section are thus oriented in each case in such a way that they minimise the cross-sectional area of the guide channel 27.

Figure 8A:
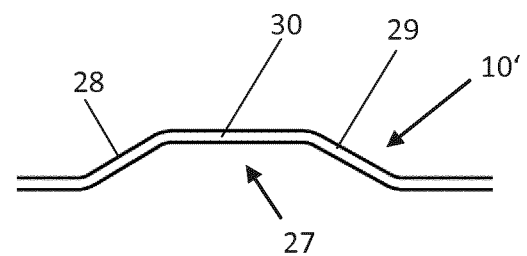
FIGS. 8a-f show sectional illustrations of guide channels according to the invention.
Figure 8B:
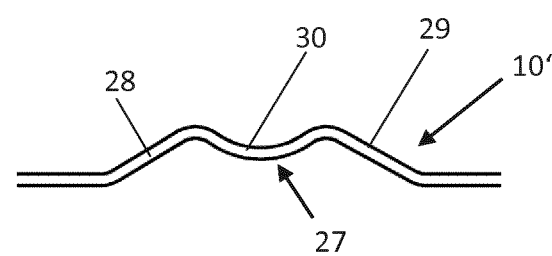
Figure 8C:
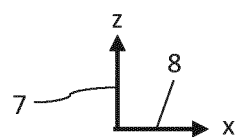
Figure 8C:
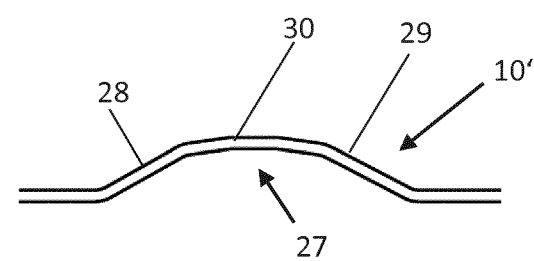
Figure 8D:
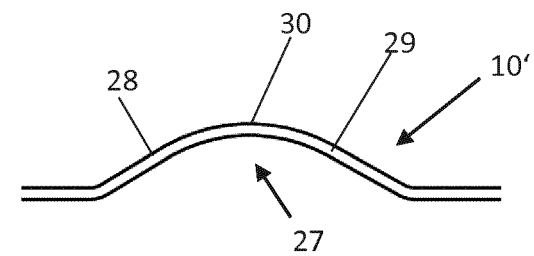
Figure 8E:
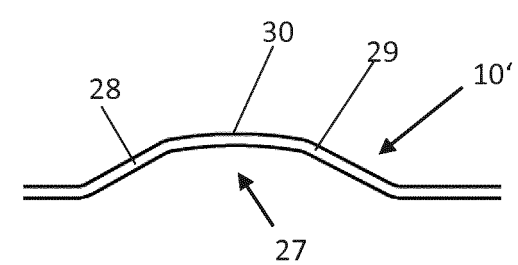
Figure 8F:
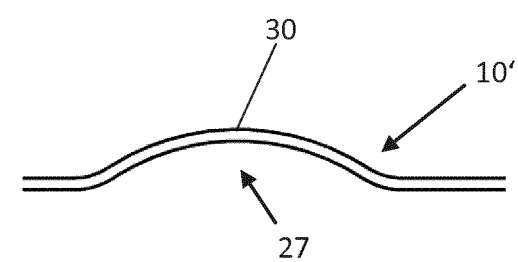

In FIG. 8*a* the cross-section of the guide channel 27 is trapezoidal, with straight side flanks 28, 29 and a straight channel roof 30. In FIG. 8*b* the side flanks 28, 29 are straight and the channel roof 30 is curved inwardly in a concave manner. In FIG. 8*c* the side flanks 28, 29 are straight and the channel roof 30 is divided into a number of short straight portions, so that the channel roof 30 is flattened relative to the side faces 28, 29. FIG. 8*d* shows straight side flanks 28, 29 and a rounded, convexly curved channel roof 30, wherein the curvature of the channel roof 30 transitions smoothly, i.e. without edges, into the straight side flank 28, 29. FIG. 8*e* shows straight side flanks 28, 29 and a convexly curved channel roof 30, wherein the transition of the curvature of the channel roof 30 into the side flanks 28, 29 has edges. FIG. 8*f* shows a completely rounded cross-section. The channel roof 30 arches over the channel convexly, without having flanks.

The bead arrangements can also, in principle, have cross-sections as shown in FIGS. 8*a-f*. The bead interior 24, the side flanks 28, 29, and the bead flanks 21, 22 then correspond to the guide channel 27, and the bead roof 23 corresponds to the channel roof 30. The heights and usually also the widths are generally greater in the case of the beads 14 than in the case of the guide channels 27.

Figure 9A:
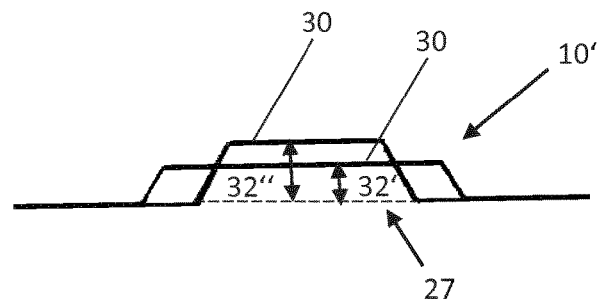
FIGS. 9a-e show sectional illustrations of guide channels according to the invention in each case at two different points of the same guide channel.
Figure 9B:
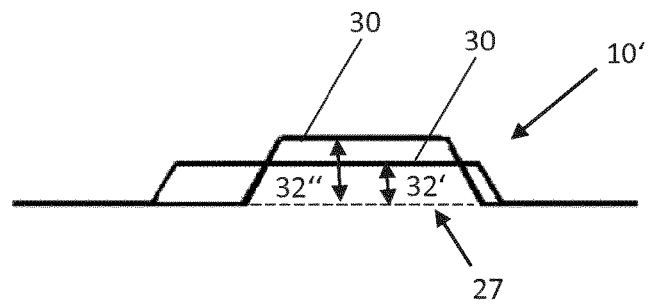
Figure 9C:
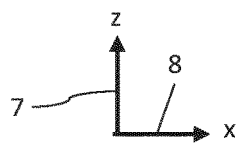
Figure 9C:
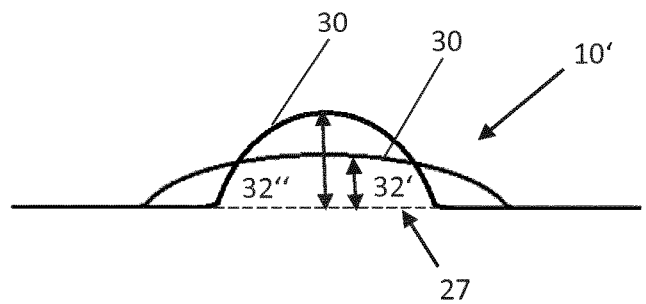
Figure 9D:
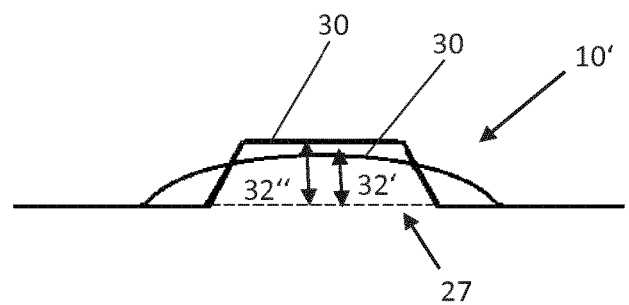
Figure 9E:
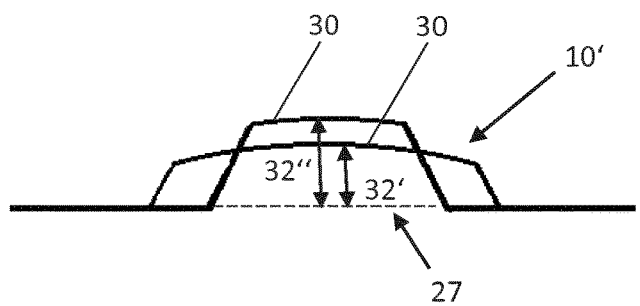

FIGS. 9a-e in turn show sectional illustrations of various embodiments of the guide channels 27 according to the invention from FIGS. 5-7. The planes of section are again oriented perpendicularly to the flat surface plane of the individual plate 10' and perpendicularly to the direction of media flow through the guide channel 27. Here, each of FIGS. 9a-e shows two sections of the same guide channel at different distances from the bead arrangement 14a. Here, it can be seen that the geometric shape of the cross-section of the same guide channel 27 can change along its extent. For example, the shape of the cross-section of the guide channel 27 in FIG. 9d transitions from a trapezoid shape into a convexly curved shape. FIG. 9b shows that the guide channels 27 can be formed asymmetrically.

The greatest height 32" and the smallest height 32' of the particular guide channel 27 are also shown. The associated widths 31", 31' of the channel 27 have not been shown, merely for the sake of clarity. The cross-section with the greater width in each case has a shorter distance from the bead arrangement 14a than the cross-section with the smaller width. It can thus be seen clearly in FIGS. 9a-e that the width of the guide channel 27, defined in each case at half height of the guide channel 27, increases in the direction of the bead arrangement 14a, whereas the height 32', 32" of the guide channel 27 decreases in the direction of the bead arrangement 14a. However, the shape of the cross-section of the guide channel 27 changes here in each case in such a way that the cross-sectional area along the extent of the channel changes in each case at most by 20%, preferably in each case by less than 10%.

The invention claimed is:

1. A separator plate for an electrochemical system, comprising:
   at least one passage opening for forming a media channel for feeding or discharging media;
   at least one bead arrangement arranged around the at least one passage opening for the purpose of sealing the at least one passage opening, wherein the bead arrangement has at least one bead flank wherein the at least one bead flank comprises at least one opening for conducting a medium through the bead flank; and
   at least one guide channel, which is connected, on an exterior of the bead arrangement, to the opening in the bead flank and is fluidically connected to a bead interior of the bead arrangement via the at least one passage opening, in the bead flank;
   wherein the guide channel is designed such that a guide channel width parallel to a flat surface plane of the separator plate increases in a direction of the bead arrangement at least in sections.

2. The separator plate according to claim 1, wherein the guide channel is designed such that a height of the guide channel determined perpendicularly to the flat surface plane of the separator plate decreases in the direction of the bead arrangement at least in sections.

3. The separator plate according to claim 1, wherein the guide channel is designed such that a cross-sectional area of the guide channel along a middle 25% of the extent of the guide channel, changes by 25%, and wherein the guide channel extends from an end of the guide channel facing away from the bead arrangement to the opening in the bead flank.

4. The separator plate according to claim 1, wherein the guide channel is designed such that the width of the guide channel increases monotonically along the guide channel, at least over 60% of a length of the guide channel adjacent to the bead flank, and wherein the guide channel extends from an end of the guide channel facing away from the bead arrangement to the opening in the bead flank.

5. The separator plate according to claim 1, wherein the guide channel is designed such that the width of the guide channel increases linearly.

6. The separator plate according to claim 1, wherein the guide channel is designed such that a height of the guide channel decreases monotonically along the guide channel, wherein the guide channel extends from an end of the guide channel facing away from the bead arrangement to the opening in the bead flank.

7. The separator plate according to claim 1, wherein the guide channel is designed such that the width of the guide channel increases at least along 160% of a length of the guide channel adjacent to the bead flank at least by 10%, and wherein the guide channel extends from an end of the guide channel facing away from the bead arrangement to the opening in the bead flank.

8. The separator plate according to claim 1, wherein in an uncompressed state of the bead arrangement, the opening in the bead flank reaches, perpendicularly to the flat surface plane of the separator plate, as far as a height that is at most 80% of a height of the bead arrangement.

9. The separator plate according to claim 1, wherein in an uncompressed state of the bead arrangement, the guide channel is designed such that an inlet or an outlet of the guide channel, which forms an end of the guide channel facing away from the bead arrangement, reaches, perpendicularly to the flat surface plane of the separator plate, as far as a height that is at most 90% of a height of the bead arrangement.

10. The separator plate according to claim 1, wherein the guide channel has a rectangular, trapezoid, or at least partially rounded cross-section, at least in some sections.

11. The separator plate according to claim 1, wherein the guide channel is designed such that a roof of the guide channel has a convex curvature in the direction of the bead arrangement, at least in some sections.

12. The separator plate according to claim 11, wherein the opening is arranged in the bead flank, connected by the guide channel on the exterior of the bead arrangement, in a region of an inflection point of a portion of the bead arrangement extending in a wave-like manner.

13. The separator plate according to claim 1, wherein the separator plate is formed as a bipolar plate with two individual plates connected to one another, and wherein the bead arrangement and the guide channel are formed in at least one of the individual plates.

14. The separator plate according to claim 13, wherein the bead arrangement, the guide channel, and the individual plate in which the bead arrangement and the guide channel are formed, are formed in one piece, and wherein the bead arrangement and the guide channel are formed integrally in the individual plate.

15. The separator plate according to claim 14, wherein at least one of the bead flanks of the bead arrangement has multiple openings, which are each connected on the exterior of the bead arrangement by a separate guide channel, which widens in the direction of the bead arrangement at least in some sections, and wherein an integrally bonded connection between the individual plates is formed, at least between some of the guide channels arranged directly adjacently to one another.

16. The separator plate according to claim 15, wherein the integrally bonded connection is a soldered connection, an adhesively bonded connection, or a welded connection.

17. The separator plate according to claim 13, wherein the individual plates are formed from metal, and wherein a thickness of the individual plates defined perpendicularly to a flat surface plane of the individual plates is in each case between 50 μm and 150 μm.

18. The separator plate according to claim 13, wherein the individual plates enclose a hollow space for passage of a cooling medium.

19. The separator plate according to claim 18, wherein the hollow space for the passage of the cooling medium is in fluid communication with the bead interior.

20. The separator plate according to claim 13, wherein at least one of the individual plates has a structure on its surface facing away from the other individual plate for guiding reaction medium, and wherein the structure for guiding the reaction medium is in fluidic communication with the bead interior via at least one inlet or outlet of the guide channel in the form of an opening in the individual plate.

21. The separator plate according to claim 1, wherein the opening in the bead arrangement and the guide channel are arranged on a flank of the bead arrangement facing away from the at least one passage opening, of the separator plate and/or on a flank of the bead arrangement facing in a direction of the at least one passage opening, of the separator plate.

22. The separator plate according to claim 1, wherein the bead arrangement is formed at least in some sections in such a way that the bead flanks each form an angle of less than 70 degrees, with a vertical direction oriented perpendicularly to the flat surface plane of the separator plate, and in that a bead roof has a convex curvature, so that the bead roof has a lower rigidity than the bead flanks.

23. The separator plate according to claim 1, wherein a height of the bead arrangement in an uncompressed state is less than 800 μm.

* * * * *